United States Patent [19]

Murray

[11] 4,196,886

[45] Apr. 8, 1980

[54] FLUID CONTROL VALVE

[75] Inventor: Myles N. Murray, Chagrin Falls, Ohio

[73] Assignee: Industrial Electronic Rubber Co., Twinsburg, Ohio

[21] Appl. No.: 597,569

[22] Filed: Jul. 21, 1975

[51] Int. Cl.² .............................................. F16K 1/34
[52] U.S. Cl. .................................. 251/357; 251/358; 251/368
[58] Field of Search ................ 251/357, 358, 361, 368

[56] References Cited

U.S. PATENT DOCUMENTS

| | | | |
|---|---|---|---|
| 2,414,577 | 1/1947 | Adair et al. | 137/434 |
| 2,953,347 | 9/1960 | Phillips | 251/361 |
| 3,090,596 | 5/1963 | Gifford | 251/357 |
| 3,236,496 | 2/1966 | Rosenstein et al. | 251/357 |
| 3,326,520 | 6/1967 | Guenther | 251/358 |
| 3,445,089 | 5/1969 | Murray | 251/358 |
| 3,531,086 | 9/1970 | Shannon | 137/434 |

OTHER PUBLICATIONS

Introduction to Rubber Technology—Morton—Reinhold Pub. Corp., New York, 1959—p. 292.
Synthetic Rubber—Whitby—John Wiley & Sons, Inc., New York 1954—pp. 808 and 809.
Vulcanization and Vulcanizing Agents—Hoffmann—Palmerton Pub. Co., Inc.—N.Y., FIGS. 2 & 3 & p. 76.

Primary Examiner—William R. Cline
Assistant Examiner—H. Jay Spiegel
Attorney, Agent, or Firm—Maky, Renner, Otto & Boisselle

[57] ABSTRACT

The present invention provides an improvement in fluid flow control valves which utilize polymeric rubbery materials either as the valve member or the valve seat in the flow control valve. The improvements are obtained by utilizing as the rubbery material for either the valve seat or the valve, a semi-rigid to rigid rubbery material prepared by curing a nitrile rubber with from three to 15 parts of sulfur per 100 parts of rubber. Such cured rubbers when utilized in said application, have been found to overcome the problems exhibited by the rubbery materials heretofore used for such applications.

3 Claims, 5 Drawing Figures

FLUID CONTROL VALVE

BACKGROUND OF THE INVENTION

This invention relates to improvements in fluid flow control devices, and in particular to carburetors and float or diaphragm actuated flow control valves for controlling either fuel, vapor, or air passages. The invention further relates to a solution to the problem of undesirable leakage past a valve such as a float type fuel inlet valve or an air or vapor vent valve.

The control valves conventionally comprise a conically shaped valve member cooperating with an edge zone of a wall defining a fluid passage or orifice as a valve seat. The valve member usually is associated with a suitable float mechanism or other means for regulating or controlling the relative position of the valve member in relation to the valve seat to control fluid flow from a supply into the receptacle of the carburetor as the fuel therein is delivered into the cylinders of an engine together with the requisite amount of air to provide a combustible mixture. In some applications, both the valve and valve seat member are formed of metal such as brass or other suitable metal.

Fluid control valves having such metal-to-metal contact between the valve member and valve seat encounter problems due to the presence of minute dirt particles in engine fuels which may hold the valve member open when it should be closed thereby permitting leakage of a portion of the fuel past the valve seat and through the port to the fuel bowl. This leakage results in excess consumption of fuel and also may be sufficient to raise the fuel level or pressure in the carburetor bowl and cause flooding of the carburetor and enriched air-fuel mixture or charge to the engine thereby producing stalling and/or subsequent difficult starting of the engine. Moreover, the repeated metal-to-metal contact during the opening and closing action in the fuel control valve during the use of the carburetor causes wear of the valve seat and valve. The high frequency engine vibration also aggravates wear of the metallic valve members reducing the efficiency of the control valve.

A solution to the metal-to-metal contact problem in control valves described above which has been proposed involves the use of a valve having a flexible tip of rubber-like material working with a metal seat or, alternatively, a metal needle valve working with a rubber valve seat. Examples of patents describing needle valves with resilient tips include U.S. Pat. Nos. 3,236,496; 3,090,596; 3,445,089; 2,414,577; 3,531,086 and 3,326,520. Most of these patents describe various configurations for flexible tips of rubber-like material, which tips may be comprised essentially of rubber or may be a metallic tip to which the rubber is molded and locked in place. Examples of prior art patents describing the use of valve seat constructions wherein the valve seat is formed of a yieldable or resilient rubbery material and cooperates with a metallic valve member include U.S. Pat. Nos. 2,953,347 and 3,236,496. As mentioned above, these patents suggest the use of such flexible materials for the purpose of overcoming leakage of fuel in cases of wear, engine vibration or misalignment of the valve structure in use.

The rubber-like resilient materials which have been suggested as being useful as the tip of the valve member or as the valve seat have included such rubber materials as neoprene (polychloroprene), thiorubbers, nylon and Buna-N (butadiene acrylonitrile) although the utility of such rubbers for valve tips in contact with highly aromatic fuels is questioned in U.S. Pat. No. 3,236,496.

It is essential that the rubber-like material utilized in the flow control valves be resistant to the fuel passing through the control valve. In the presence of gasolines and fuels of high aromatic character, and under the operative temperature conditions to which carburetors are conventionally subjected, such as, for example, temperatures in the order of 210°-220° F., the synthetic rubber tips and valve parts may become soft and pudgy and stick to the metallic parts of the control valve. Alternatively, the rubber-like material may swell to such an extent as to upset the fuel control characteristics of the carburetor and change the flow rate to the carburetor bowl. Similar flow rate changes may occur due to heat or compression set or due to volume changes in the rubber-like parts resulting from the ultimate wetting of these parts with the fuel at the operating temperatures and subsequent drying thereof in ambient temperatures when the carburetor is not functioning.

A solution to the problems resulting from the use of the rubber-like material of the prior art described above has been proposed in U.S. Pat. No. 3,236,496 wherein there is described the use of a soft molded and cured fluoroelastomeric type material commercially available under the trade names "Viton" and "Fluorel". "Viton" is made by the E. I. du Pont de Nemours and Company and "Fluorel" is produced by Minnesota Mining and Manufacturing Co. More specifically, U.S. Pat. No. 3,236,496 describes the use of a composition wherein the elastomeric constituent consists essentially of a polymeric compound of hexafluoropropylene and vinylidene fluoride such as a copolymer containing 30% to 60% by weight of hexafluoropropylene and 70% to 40% by weight of vinylidene fluoride monomer or a terpolymer thereof with tetrafluoroethylene. These fluorinated polymers are reported to be especially useful for forming valve seats and valves which come in contact with gasoline, and it is reported that such fluorinated polymer compounds are superior for such use when compared to other cured rubbery materials such as thiorubber, Buna-N rubber, neoprene rubber, etc.

Fluid control valve tips which have been utilized in internal combustion engines in the past few years have incorporated the use of the synthetic fluorinated rubbers commercially available under the trade designations "Viton" and "Fluorel". However, this material is more expensive than other rubber-type materials and some difficulties have been observed when the material is utilized for valve tips for carburetors of high compression engines in which highly aromatic fuels are employed. The "Viton" and similar fluorinated polymers have a greater tendency to swell in the highly aromatic fuels.

Another proposed solution to the problems resulting from the swelling and drying of the rubber materials is to reduce the amount of rubber utilized on the valve tip. It has been proposed, for example, that the swelling problems can be reduced if the amount of rubber utilized in the preparation of a tip is reduced. Thus, it has been suggested that needle valves be prepared with metallic tips which may then be coated with a thin layer of rubber. Various metal tip shapes have been proposed in, for example, U.S. Pat. Nos. 3,326,520, 3,445,089 and 3,531,086 to permit the molding of a thin rubber coating with good bonding characteristics.

SUMMARY OF THE INVENTION

The present invention provides an improvement in fluid flow control valves which utilize polymeric rubbery materials either as the valve member or the valve seat in the flow control valve. The improvements are obtained by utilizing as the rubbery material for either the valve seat or the valve, a semi-rigid to rigid rubber material prepared by curing a nitrile rubber with from three to 15 parts of sulfur per 100 parts of rubber. Such cured rubbers when utilized in said application, have been found to overcome the problems exhibited by the rubbery materials heretofore used for such applications.

DESCRIPTION OF THE PREFERRED EMBODIMENTS

It has now been found that an improved fluid control valve can be prepared by utilizing a semi-rigid to rigid nitrile rubber material as the needle valve tip, as a coating for a needle valve metal tip or a portion thereof, or as a coating or gasket for the valve seat contacting the needle valve tip such as illustrated in FIGS. 1 through 5.

Figure 1:
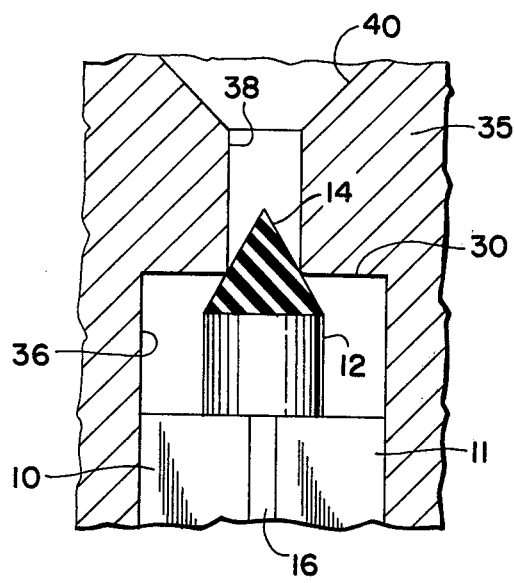
FIG. 1 illustrates an embodiment of this invention wherein the conical portion of the valve includes the nitrile rubber of the invention.

In FIG. 1, the fluid control valve is illustrated as comprising needle housing structure 35 in which there is constructed a fuel inlet port 40 adapted to be operatively connected to a fuel source such as a gas tank and fuel pump (not shown) to receive the fuel therefrom, fuel port means 38 and a recess 36 which houses the needle valve shown in part as 10. The needle valve 10 comprises an elongated body 11, generally of metal, a body extension 12 and a resilient conical tip 14. Needle 10 is provided with bearing ribs 16 which provide the needle with several flow paths for the fuel from fuel inlet port 40 to, for example, the float bowl of a carburetor (not shown). Needle 10 cooperates with a rigid valve seat designated 30.

Figure 5:
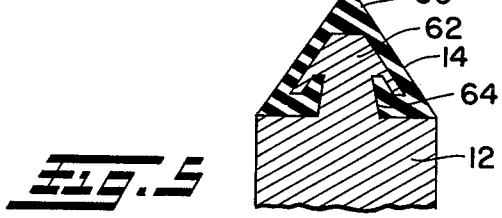
FIG. 5 illustrates a fragmented section of a spear-shaped tip end of a valve with a conical-shaped coating of nitrile rubber.

The semi-rigid to rigid rubber conical tip 14 of needle valve 10 may be comprised entirely of rubber or may include a metal head with a coating of the rubber material such as illustrated, for example, in FIG. 5.

Figure 2:
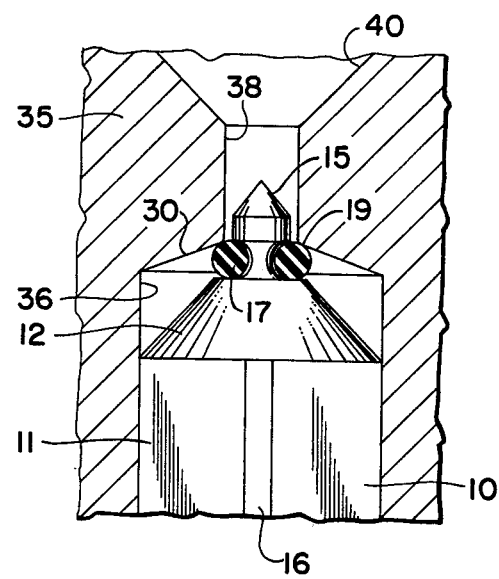
FIG. 2 illustrates another embodiment of the invention wherein an O-ring of the nitrile rubber of the invention is fitted around the valve for contact with the valve seat.

FIG. 2 shows a modification where the needle 10 and particularly body extension 12 is provided with an annular groove 19 below conical tip 15 which in this illustration is made of metal. The groove is provided with a semi-rigid to rigid rubber ring 17 of the nitrile rubber composition of the invention and which may be secured in this groove frictionally, adhesively or as the result of molding.

Figure 3:
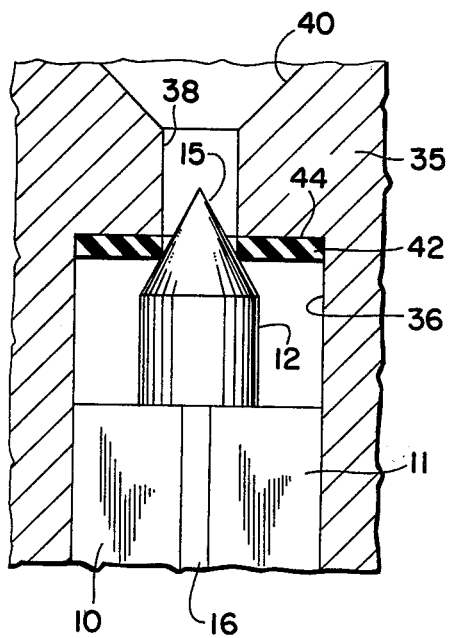
FIG. 3 illustrates another embodiment wherein the valve seat includes the nitrile rubber of the invention.

FIG. 3 illustrates fluid control valve means utilizing a flexible seat 42 of the nitrile rubber composition of the invention in the form of an annular washer which is secured against the edge portion 44 of needle housing structure 35. As in FIG. 2, the conical needle tip 15 is rigid and is preferably of metal.

Figure 4:
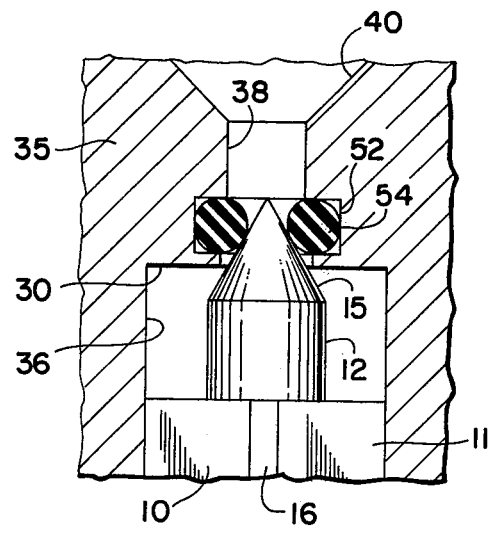
FIG. 4 illustrates a variation of the embodiment of FIG. 3.

FIG. 4 illustrates another embodiment of the invention with needle 10 provided with a conventional tapered metal tip 15 as in FIG. 3 but needle housing structure 35 is provided with a circular groove 52 in which an annular semi-rigid to rigid nitrile rubber ring 54 is secured.

FIG. 5 illustrates one form of the resilient tip 14 of the needle valves of this invention such as needle valve 10 wherein the tip comprises a metal head 62 and neck portion 64 attached to body extension 12 of the needle. In FIG. 5, the metal head is in the shape of a blunt spear tip. About the head portion 62 and neck portion 64, there is a conical-shape coating 60 of the nitrile rubber composition of the invention. It is preferred that the nitrile rubber be applied to the head of needle valve 10 in a suitable molding apparatus.

While FIGS. 1 through 5 illustrate certain embodiments of the fuel flow regulating valve means and of the needle valves of the invention, it will be appreciated that modifications of the structures can be made within the scope of the invention. For example, the needle valve tip configuration may be modified as required by the particular regulating valve means in which it is to be incorporated. Also, although FIG. 5 illustrates a needle tip in which the nitrile rubber composition is molded about a spear-shaped body, other types of shaped bodies as known in the prior art and discussed in, for example, U.S. Pat. Nos. 3,445,089, 3,326,520 and 3,531,086 can be substituted for the spear shape of FIG. 5.

The semi-rigid to rigid rubbers which are useful for the above-described purpose are those which may be obtained by vulcanizing or curing nitrile rubbers with from about three to 15 parts of sulfur per 100 parts of the rubber. Preferably, from about six to 15 parts of sulfur are utilized per 100 parts of rubber.

The useful nitrile rubbers include copolymers of a diene and an unsaturated nitrile. The best known and most available commercial nitrile rubbers are the copolymers of butadiene and acrylonitrile. The commercially available nitrile rubbers contain varying amounts of the two ingredients but generally will contain from about 18% to about 50% of acrylonitrile. Since the oil and fuel resistance properties improve with increasing acrylonitrile content, the available nitrile rubbers containing the higher amounts of acrylonitrile will be preferred for use with this invention.

Carboxylic-modified nitrile rubbers also may be utilized with this invention. This type of polymer contains an addition to the butadiene and acrylonitrile, one or more acrylic-type acids as part of the comonomer system. The polymerization of these monomers produces a chain similar to the normal nitrile rubber except for the carboxyl groups which are distributed along the chain at varying frequencies.

These nitrile rubbers are compounded for use in this invention in the usual manner except that from three to 15 parts of sulfur are utilized rather than the normal 0.5 to two parts per 100 parts of rubber. In addition to the sulfur, the formulation generally includes an activator such as zinc oxide, pigments as desired, softeners or plasticizers such as fatty acids and esters, organic sulfur-containing accelerators such as tetramethylthiuram disulfide, antioxidants and stabilizers, lubricants such as stearic acid, etc. The art of formulating and curing nitrile rubbers is well known and variations in formulations for particular results will be apparent to those skilled in the art.

It has now been found that if these commercially available nitrile rubbers are subjected to vulcanizing or curing conditions which result in additional cross linking, the semi-rigid to rigid copolymers obtained are particularly useful in liquid fuel flow regulating valves. For example, when needle valves used in fuel inlet valve assemblies of carburetors for internal combustion engines are prepared with a tip of the semi-rigid to rigid nitrile rubber prepared by curing a nitrile rubber with from about three to 15 parts of sulfur per 100 parts of rubber, the rubber tip resists swelling on contact with fuels to a greater extent than the rubbery materials heretofore utilized for this purpose, and the rubbery tip of the invention exhibits desirable shrinking characteristics on drying after exposure to the fuel even after extended periods. Accordingly, the liquid fuel flow regulating valve means which incorporates the semi-rigid to rigid nitrile rubber in the manner described above exhibit improved efficiency and reliability over an extended period of use even when highly aromatic fuels pass through the fluid control valves.

The following examples illustrate the formulation and preparation of a semi-rigid butadiene-acrylonitrile elastomeric composition useful in the present invention. Unless indicated, all parts and percentages are by weight.

EXAMPLE 1

| | |
|---|---|
| Buna-N Rubber (Chemigum N-206 from Goodyear containing about 45% acrylonitrile) | 100.0 |
| Sulfur | 10.5 |
| Zinc Oxide | 5.0 |
| Stearic Acid | 1.0 |
| "Age-Rite Resin D" (Antioxidant from Vanderbilt Company) | 1.0 |
| Thermal Carbon Black (N-990) | 55.0 |
| SRS Carbon Black (N-762) | 88.0 |
| Tributyloxyethylphosphonate (Plasticizer) | 20.0 |
| Di-(butoxyethoxyethyl) adipate | 5.0 |
| N-cyclohexyl-2 benzothiazole sulfonamide (Santocure) | 1.0 |
| Tetramethylthiuram disulfide | 2.0 |

A semi-rigid rubber is obtained from the above formulation by heating the mixture to a temperature of 300° for one hour. The product has a durometer (Shore A) of 95±5, a tensile strength of 3,000 psi, an elongation of 100%.

EXAMPLE 2

The procedure of Example 1 is repeated except that eight parts of sulfur are incorporated into the formulation. The rubber obtained is less rigid than the rubber of Example 1.

EXAMPLE 3

The procedure of Example 1 is repeated except that 12 parts of sulfur are used in the formulation. The rubber obtained is more rigid than the rubber of Example 1.

EXAMPLE 4

The procedure of Example 1 is repeated except that the rubber used in the formulation contains about 40% of acrylonitrile.

The superior fuel resistant properties of the product obtained in Example 1 as compared to a Buna-N type rubber prepared from the same formulation as shown in Example 1 except that only one-half part of sulfur is utilized are demonstrated by subjecting the products obtained to a fuel swelling test, measuring the percent of volume expansion after a given period followed by drying of the samples for a given period of time to determine the extent of shrinkage under the test conditions. In this test, a sample specimen of the rubber material is immersed in a standard reference fuel identified as ASTM Reference Fuel C containing by volume, 50% of iso-octane and 50% of toluene. The fuel is then heated to a temperature of about 212° F. and maintained at this temperature for 70 hours. At the end of this period, the specimens are removed and the change in volume due to swelling is noted. The materials then are subjected to a 24 hour dry-out period at 158° F. whereupon the volume change is again noted.

When a sample of the rubber prepared in Example 1 is subjected to the above-described swelling test, the specimen increased in volume by 7.4%. The sample of Buna-N cured with only one-half part of sulfur and subjected to the heated fuel for a period of 70 hours at only 158° F. was found to have an increase in volume of 14%. When both samples were dried as described above, the product of Example 1 was found to have a volume change from the original of only −0.6% whereas the volume change from original observed for the Buna-N cured with only one-half part of sulfur was found to be −8.6%.

The improvement which is obtained when the semi-rigid to rigid polybutadiene rubbers of this invention are utilized for preparing needle valves with resilient tips such as illustrated in FIG. 5 as compared to similar needle valves whose tips are coated with fluoropolymers such as those described in U.S. Pat. No. 3,236,496 can be demonstrated as follows. The butadiene semi-rigid rubber utilized for this comparison is the rubber described and prepared in Example 1. The fluorine-containing rubbers of the prior art utilized in this test have the following formulations:

| | |
|---|---|
| Formulation A | |
| "Viton B-50" (Terpolymer of hexafluoropropene, vinylidene fluoride and tetrafluoroethylene) | 85.0 |
| "Viton A-35" (Copolymer of hexafluoropropene and vinylidene fluoride) | 15.0 |
| Zinc Oxide | 10.0 |
| Dibasic Lead Phosphite ("Dyphos") | 10.0 |
| Medium Thermal Carbon Black (N-990) | 33.0 |
| SAF Carbon Black (N-358) | 15.0 |
| AC Polyethylene 617 | 1.0 |
| Hexamethylenediamine Carbamate (Diak No. 1) | 2.0 |
| Formulation B | |
| Fluorel 2170 (A copolymer of hexafluoropopene and vinylidene fluoride) | 80.0 |
| "Viton B-50" | 20.0 |
| Barium Sulfate | 15.0 |
| Magnesium Oxide | 17.0 |
| Zinc Oxide | 6.0 |
| "Dyphos" | 7.0 |
| Hexamethylenediamine Carbamate | 1.5 |
| Calcium Hydroxide | 3.0 |
| Titanium Dioxide | 1.0 |
| Monastral Blue | 2.0 |

The above formulations A and B may be compounded in accordance with the standard procedures published for compounding "Viton" rubbers on a rubber mill.

Metallic needle bodies such as illustrated in FIG. 5 are coated with the rubbers of Example 1 and Formulations A and B described above utilizing the transfer molding technique. The rubber material is placed in the heated cavity of a forming mold and the metal needle body is placed into the mating cavity in a second heated plate of a two-plate mold. The mold is closed and put in a press which applies a load onto the mold so that the pressure on the entrapped rubber is approximately 2500 psi. In the case of the rubber of Example 1, the needle is maintained within the mold for five minutes at a temperature of 275° whereupon the needle is removed from the mold and placed in a curing oven for one hour at 300° F. With the rubber of Formulations A and B, the needle is maintained within the mold for ten minutes at a temperature of 320° whereupon the needle is removed and subjected to a post-cure in an oven at 400° F. for 16 hours. Sheets of the rubbers of Example 1 and Formulations A and B also are prepared under similar temperature conditions as described for the curing of the above molded needle tips. The physical properties of the formed sheets is reported below in Table I. In order to compare the swelling characteristics of the three prepared rubbers when exposed to highly aromatic gasoline, specimens of the sheets were obtained and subjected to a soaking test in ASTM Standard Reference Fuel C (50% iso-octane and 50% toluene) at 212° F. The rubber specimens were periodically removed from the boiling reference fuel for a measurement of durometer, tensile strength, elongation and volume change from original. After these measurements were made, the specimens were returned to the boiling reference fuel.

TABLE I

| | Affect of Reference Fuel C at 212° F. | | | |
|---|---|---|---|---|
| Compound | Time in Fuel (hrs.) | Durometer (Shore A) | Tensile (p.s.i.) | Elongation (%) | Volume Change From Original (%) |
| A | — | 90 | 1800 | 125 | — |
| B | — | 82 | 2000 | 100 | — |
| 1 | — | 95 | 3000 | 100 | — |
| A | 2 | 87 | 1350 | 100 | 11.26 |
| B | 2 | 78 | 1200 | 75 | 10.90 |
| 1 | 2 | 92 | 2000 | 50 | 8.67 |
| A | 4 | 82 | 1350 | 100 | 15.23 |
| B | 4 | 76 | 1100 | 50 | 14.58 |
| 1 | 4 | 92 | 1500 | 50 | 10.00 |
| A | 6 | 83 | 1350 | 100 | 16.74 |
| B | 6 | 76 | 1100 | 50 | 16.57 |
| 1 | 6 | 91 | 1450 | 50 | 10.73 |
| A | 24 | 80 | 1350 | 100 | 19.81 |
| B | 24 | 76 | 1100 | 50 | 20.09 |
| 1 | 24 | 92 | 1400 | 50 | 9.77 |
| A | 60 | 78 | 1350 | 100 | 20.28 |
| B | 60 | 76 | 1100 | 50 | 20.26 |
| 1 | 60 | 94 | 1950 | 50 | 7.40 |
| A | 168 | 78 | 1100 | 100 | 20.15 |
| B | 168 | 76 | 1000 | 50 | 20.16 |
| 1 | 168 | 95 | 1750 | 50 | 5.50 |

A consideration of the data in Table I comparing the rubber of the present invention as illustrated by Example 1 with the data obtained on the "Viton" specimens (Formulations A and B) indicates that the specimens of the rubber of Example 1 of this invention on soaking and standard reference fuel undergoes a smaller volume change than the "Viton" or "Fluorel" rubbers and, moreover, that the volume change begins to decrease after the six hour period from a maximum volume change of about 10.73% to a volume change of 5.50% after 168 hours of soaking.

The coated needle valves prepared above were subjected to the same soaking action in ASTM Reference Fuel C at a temperature of about 212° F. for an extended period of time. The average gauge length of the needle valve from tip-to-tip is measured initially and periodically during the soaking test. Table II reports the results of such measurements and the gauge length change from the original length. The results likewise indicate the superior properties of the butadiene rubbers of the invention as compared to the prior art "Viton" and "Fluorel" rubber compositions.

TABLE II

| Valve Tip Coating Compound | Time in Fuel (hrs.) | Ave. Gauge Length (inch) | Gauge Length Change From Original (inch) |
|---|---|---|---|
| A | — | 0.6925 | — |
| B | — | 0.6916 | — |
| 1 | — | 0.6930 | — |
| A | 2 | 0.6945 | +.0020 |
| B | 2 | 0.6935 | +.0019 |
| 1 | 2 | 0.6943 | +.0013 |
| A | 4 | 0.6948 | +.0023 |
| B | 4 | 0.6935 | +.0019 |
| 1 | 4 | 0.6947 | +.0017 |
| A | 6 | 0.6947 | +.0022 |
| B | 6 | 0.6935 | +.0019 |
| 1 | 6 | 0.6952 | +.0022 |
| A | 24 | 0.6948 | +.0023 |
| B | 24 | 0.6935 | +.0019 |
| 1 | 24 | 0.6952 | +.0022 |
| A | 60 | 0.6950 | +.0025 |
| B | 60 | 0.6941 | +.0025 |
| 1 | 60 | 0.6951 | +.0021 |
| A | 168 | 0.6952 | +.0027 |
| B | 168 | 0.6936 | +.0020 |
| 1 | 168 | 0.6942 | +.0012 |
| A | 336 | 0.6952 | +.0027 |
| B | 336 | 0.6938 | +.0022 |
| 1 | 336 | 0.6933 | +.0003 |
| A | 504 | 0.6951 | +.0026 |
| B | 504 | 0.6933 | +.0017 |
| 1 | 504 | 0.6926 | −.0004 |
| A | 840 | 0.6958 | +.0033 |
| B | 840 | 0.6940 | +.0024 |
| 1 | 840 | 0.6930 | +.0000 |

The behavior of rubber strips prepared with the rubbers of Example 1 and Formulations A and B upon drying after being subjected to 168 hours of soaking in ASTM Reference Fuel C at a temperature of about 212°

F. is summarized in the following Table III. The data reported in Table III were obtained by drying specimens of the indicated rubbers in an oven at a temperature of 158° F. for the given periods of time and thereafter measuring the volume change from the original.

TABLE III

| Compound | Drying Time (hrs.) | Volume Change From Original (%) |
|---|---|---|
| A | 4 | 11.09 |
| B | 4 | 12.06 |
| 1 | 4 | 2.10 |
| A | 24 | 5.30 |
| B | 24 | 5.46 |
| 1 | 24 | −0.67 |
| A | 168 | 0.10 |
| B | 168 | 1.50 |
| 1 | 168 | −4.26 |

The embodiments of the invention in which an exclusive property or privilege is claimed are defined as follows:

1. In a fluid flow regulating valve means comprising port means including a valve seat and port restricting means including a valve member, said valve seat and valve member being relatively movable for effecting engagement and disengagement thereof, the improvement comprising said valve member having a conical tip adapted to control the flow of fuel through said port restricting means, said conical tip including a surface of a semi-rigid to rigid rubber material prepared by curing a nitrile rubber with from about six to 15 parts sulfur per 100 parts of rubber, wherein the nitrile rubber is a butadiene-acrylonitrile copolymer containing about 18 to about 50% acrylonitrile.

2. In a fluid flow regulating valve means comprising port means including a valve seat and port restricting means including a valve member, said valve seat and valve member being relatively movable for effecting engagement and disengagement thereof, the improvement comprising said valve seat comprising a semi-rigid to rigid rubber material prepared by curing a nitrile rubber with from about six to 15 parts of sulfur per 100 parts of the rubber, wherein the nitrile rubber is a butadiene-acrylonitrile copolymer comprising from about 18% to about 50% of acrylonitrile.

3. A rubber tip valve element comprising an elongated metal body and a composite tip secured at one end of said metal body said tip including a metal head and body extension and a semi-rigid to rigid rubber material molded about the head, said rubber material comprising a rubber prepared by curing a nitrile rubber with about ten parts of sulfur per 100 parts of the rubber, wherein the nitrile rubber is a butadiene-acrylonitrile copolymer comprising from about 18 to 50% of acrylonitrile.

* * * * *